United States Patent
Von Tardy-Tuch et al.

(10) Patent No.: US 10,378,607 B2
(45) Date of Patent: Aug. 13, 2019

(54) INERTER DEVICE FOR A WHEEL SUSPENSION OF A VEHICLE

(71) Applicant: Dr. Ing. h.c. F. Porsche Aktiengesellschaft, Stuttgart (DE)

(72) Inventors: Georg Von Tardy-Tuch, Unterreichenbach-Kapfenhardt (DE); Philipp Röding, Rutesheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/911,770

(22) Filed: Mar. 5, 2018

(65) Prior Publication Data
US 2018/0259030 A1   Sep. 13, 2018

(30) Foreign Application Priority Data
Mar. 7, 2017   (DE) .......................... 10 2017 104 765

(51) Int. Cl.
*F16F 9/44*   (2006.01)
*B60G 13/18*  (2006.01)
(Continued)

(52) U.S. Cl.
CPC ............... *F16F 9/44* (2013.01); *B60G 13/18* (2013.01); *B60G 15/04* (2013.01); *B60G 15/062* (2013.01);
(Continued)

(58) Field of Classification Search
CPC .... F16F 9/44; F16F 9/504; F16F 9/512; F16F 9/5123; F16F 9/14; B60G 13/18;
(Continued)

(56) References Cited

U.S. PATENT DOCUMENTS

| 4,526,047 A | * | 7/1985 | Yang | ....................... F41A 25/10 188/129 |
| 7,316,303 B2 | * | 1/2008 | Smith | .................... F16F 7/1022 188/292 |

(Continued)

FOREIGN PATENT DOCUMENTS

| DE | 102014206230 A1 | 10/2015 | |
| EP | 2511564 A2 | 10/2012 | |
| GB | 1017368 A | * 1/1966 | ............... B66D 5/00 |

OTHER PUBLICATIONS

German Search Report for German Application No. 10 2017 104 765.4, dated Nov. 6, 2017 with partial English translation, 8 pages.

*Primary Examiner* — Thomas J Williams
(74) *Attorney, Agent, or Firm* — RatnerPrestia

(57) ABSTRACT

An inerter device for a wheel suspension of a vehicle, having an inerter mass and a mechanical inerter drive which is operatively connected to the inerter mass via a coupling device. The coupling device has a control disk connected to the inerter mass and a contour disk connected to the inerter drive. The control disk and contour disk are frictionally in contact with each other via coupling surfaces. The inerter mass is reversibly movable relative to the inerter drive from an operating position into a securing position. The control disk has a contact element which, during the movement of the inerter mass into the securing position, interacts with a mating contact element of the contour disk and therefore reversibly moves the control disk from a coupling position relative to the contour disk into a release position in which the coupling surfaces are separated.

10 Claims, 6 Drawing Sheets

(51) Int. Cl.
*B60G 15/04* (2006.01)
*B60G 17/06* (2006.01)
*F16F 9/14* (2006.01)
*B60G 15/06* (2006.01)
*B60G 17/00* (2006.01)

(52) U.S. Cl.
CPC .............. *B60G 17/00* (2013.01); *B60G 17/06* (2013.01); *F16F 9/14* (2013.01); *B60G 2202/13* (2013.01); *B60G 2202/24* (2013.01); *B60G 2202/25* (2013.01); *B60G 2202/30* (2013.01); *B60G 2204/418* (2013.01); *B60G 2204/419* (2013.01); *B60G 2204/42* (2013.01); *B60G 2204/424* (2013.01); *B60G 2204/62* (2013.01); *B60G 2206/40* (2013.01); *B60G 2206/41* (2013.01); *B60G 2500/10* (2013.01)

(58) Field of Classification Search
CPC ...... B60G 15/04; B60G 15/062; B60G 17/00; B60G 17/06; B60G 2202/13; B60G 2202/24; B60G 2202/25; B60G 2202/30; B60G 2204/42; B60G 2204/62; B60G 2204/424; B60G 2204/419; B60G 2204/418; B60G 2206/40; B60G 2206/41; B60G 2500/10
USPC ........ 188/135, 174, 180, 181 R, 181 A, 187; 267/196, 205, 206, 207
See application file for complete search history.

(56) References Cited

U.S. PATENT DOCUMENTS

| | | | | |
|---|---|---|---|---|
| 9,334,914 | B2* | 5/2016 | Gartner | F16F 7/1022 |
| 10,088,006 | B2* | 10/2018 | Fox | B64C 13/40 |
| 10,145,434 | B2* | 12/2018 | Fox | F16F 7/1022 |
| 2009/0108510 | A1* | 4/2009 | Wang | F16F 7/1022 |
| | | | | 267/75 |
| 2010/0148463 | A1* | 6/2010 | Wang | B60G 13/14 |
| | | | | 280/124.101 |

* cited by examiner

INERTER DEVICE FOR A WHEEL SUSPENSION OF A VEHICLE

CROSS-REFERENCE TO RELATED APPLICATIONS

This application claims priority to German Patent Application No. DE 10 2017 104 765.4, filed Mar. 7, 2017, which is incorporated by reference herein in its entirety.

FIELD OF THE INVENTION

The present invention relates to an inerter device for a wheel suspension of a vehicle, and to a stabilizing device having an inerter device of this type.

BACKGROUND OF THE INVENTION

It is known that vehicles are intended to be stabilized for the different types of movement. In particular, it is known to use what are referred to as spring and damper combinations for the individual wheel suspensions. The spring suspension of the vehicle, i.e. the respective spring device, serves here to absorb the forces acting on the wheel suspension or to compensate for said forces with a spring force as a counterforce. In order to equalize the speeds at which the forces are introduced into the wheel suspension, the spring devices are customarily correlated with damper devices in order to be able to adapt the speed of the jounce and the speed of the rebound. Furthermore, it is known that the speed of the jounce and of the rebound is dependent not only on the actual speed at which the force strikes against the wheel suspension, but, furthermore, on the frequency and the acceleration at which the force is introduced. In the case of the chassis of a vehicle, this relates to the respective underlying surface.

A disadvantage of the previous solutions is that, at high frequencies in the excitation with which forces are introduced into the wheel suspension, a compromise would have to be obtained between the desired softness of the vehicle at said high-frequency excitations, on the one hand, and a high degree of rigidity of the vehicle in the event of lesser dynamic effects, i.e. in the event of a correspondingly smooth carriageway. For this purpose, the previous solutions use what is referred to as an inerter or an inerter device which, in addition to influencing the force and the speed of said force, permits influencing of the acceleration at which said forces are introduced into the wheel suspension.

In order to achieve this, the known inerter devices, which are used in particular in sports cars, have what is referred to as an inerter mass which can be set into an inerter mass movement. Setting into the inerter mass movement enables a counter acceleration or a counterforce to be built up in order to provide influencing of the spring device in the event of a high-frequency excitation. In other words, in the event of a high-frequency excitation, the inerter device, by means of the generated inerter mass movement, assists in deflecting the corresponding spring device, and therefore makes the spring device softer in a targeted manner in this specific use. It is therefore possible, in specific partial ranges in a chassis, i.e., for example, in the event of a high-frequency excitation on an uneven carriageway, to provide a different degree of rigidity or a softer chassis than is the case in other situations, for example in the case of a smooth carriageway covering.

It is disadvantageous in the case of the known solutions with an inerter device that the latter has to be fitted with relatively small inerter masses in order to be able to achieve sufficient mechanical permanent stability. In particular, this is because customarily inerter masses are connected by a coupling device to an associated mechanical inerter drive. As soon as the inerter mass exceeds a certain maximum size or a maximum weight, this can lead to the wear on such coupling devices, which are customarily designed as slipping couplings, increasing to a very pronounced extent. In a normal sports car operation, in particular in a normal road operation, this would lead, however, in the case of the desired high inerter masses to undesirably rapid wear, and therefore the inerter masses and therefore the effect of the inerter device on the chassis are significantly limited.

It would be desirable to at least partially eliminate the disadvantages described above. In particular, it would be desirable to use greater inerter masses for an inerter device of high reliability in a cost-effective and simple manner.

SUMMARY OF THE INVENTION

According to aspects of the invention, an inerter device for a wheel suspension of a vehicle is proposed. Such an inerter device has an inerter mass and a mechanical inerter drive which, in order to generate an inerter mass movement, is operatively connected to the inerter mass via a coupling device. An inerter device according to aspects of the invention is distinguished in that the coupling device has a control disk connected to the inerter mass and a contour disk connected to the inerter drive. Said two disks, i.e. the control disk and the contour disk, are frictionally in contact with each other via coupling surfaces. Furthermore, the inerter mass is movable relative to the inerter drive counter to a spring force of a spring device reversibly from an operating position into a securing position, wherein furthermore the control disk has a contact element which, during the movement of the inerter mass into the securing position, interacts with a mating contact element of the contour disk and therefore reversibly moves the control disk from a coupling position relative to the contour disk into a release position. In this release position, the coupling surfaces are separated from each other, and therefore the operative connection between the inerter drive, on the one hand, and the inerter mass, on the other hand, is removed.

An inerter device according to aspects of the invention therefore builds on the known inerter devices and likewise serves to set the inerter mass into an inerter mass movement in order to be able to provide a corresponding specific stabilizing effect for the chassis of a vehicle. The mechanical inerter drive, as is defined here, serves to set said inerter mass into the inerter mass movement if the specific driving situation for the chassis occurs. Such a mechanical inerter drive can customarily have, for example, a corresponding slotted drive link or a driving thread, as is explained in more detail later on. Of course, however, other mechanical inerter drives are also conceivable in order to be available as a mechanical interface with the carriageway behavior below the vehicle.

The coupling device now basically serves to provide the operative connection between the inerter drive, on the one hand, and the inerter mass, on the other hand, in a known manner. If the two coupling disks, i.e. the control disk and the contour disk, are closed, the coupling surfaces are frictionally in contact with each other, and the driving force can be transmitted to the inerter mass via the closed operative connection. The inerter mass is therefore set into movement or kept in movement.

According to aspects of the invention, said coupling has now been further developed on the basis of the previously known slipping couplings. While a normal slipping coupling has a simple spring loading such that, from a defined release force, the two coupling surfaces merge slowly and in an undefined manner a from static friction into a sliding friction situation, a defined lifting of the two coupling disks from each other is now provided according to aspects of the invention. In order to ensure this, a mechanical and therefore automated controlling or control or regulation of said control disk and of the contour disk is formed, as is explained in more detail below.

As soon as the inerter device is in use, the two coupling disks, i.e. the control disk and the contour disk, are connected to each other in the normal state, and therefore the driving force is transferred from the mechanical inerter drive to the inerter mass. As soon as the force now significantly increases and exceeds a predefined threshold, an equilibrium of forces between the spring force of the spring device, on the one hand, and the driving force introduced to the inerter mass, on the other hand, is set. As soon as said equilibrium of forces, which can be predefined by the spring force of the spring device, is exceeded, the inerter mass is therefore automatically moved in a reversible manner counter to said spring force from the operating position into the securing position. Owing to the fact that the control disk is connected or can be connected to the inerter mass, this relative movement of the inerter mass also causes a relative movement of the control disk. This is in particular a relative rotation (explained in more detail further on) between the individual components. The relative movement between the control disk and the contour disk leads in particular to a relative movement between a contact element of the control disk and the mating contact element of the contour disk. Therefore, in particular by correlating associated guide surfaces and control surfaces, the relative position between the control disk and the coupling disk is changed in such a manner that a movement takes place from a coupling position into the release position, and therefore, by means of this movement, the coupling device is opened as it were and the operative connection is separated.

The above description of the opening mechanism of the coupling device leads to the fact that, when a driving force which can be defined by the pretensioned spring force of the spring device is exceeded, not only does a slipping coupling slip, but also the coupling is brought into a released release position, with the aid of the correlation between the contact element and the mating contact element of the control disk and of the contour disk. In other words, an uncontrolled slipping no longer takes place during a transition between static friction and sliding friction, but rather, from the static friction, the frictional situation between the two coupling disks is completely removed and said removal is maintained in the release position at least for a very short period of time. As soon as the driving force which is transmitted from the inerter drive to the inerter mass subsequently drops again below the predefined limit threshold, the above explanation is reversed again, and therefore not only does the inerter mass move back again into the operating position by means of the spring force of the spring device, but also the two coupling disks arrive again from the release position into the coupling position. The operative connection is at least partially produced in said coupling position, and therefore the transmission of driving force from the mechanical inerter drive to the inerter mass is now possible in a defined manner either with the static friction already previously present or else in a defined sliding friction situation, i.e. with a defined slip between the control disk and the contour disk.

It is apparent from the above explanation that in particular the undefined part of the transition between a static friction situation into a sliding friction situation in a coupling device, as is the case in the known slipping couplings, is entirely avoided. On the contrary, it is now possible in a mechanically automated manner, namely by setting a pretensioning force for the spring force of the spring device, to be able to set or operate the coupling device in a controlling or regulating engagement in a controlled manner. Owing to the fact that the undefined state between the static friction phase and the sliding friction phase between the control disk and the contour disk can be substantially completely ruled out, significantly greater inerter masses can be used. In particular, this transition between the static friction situation and the sliding friction situation customarily leads to the very high degree of wear in the event of the increase in the inerter mass. As soon as said undefined state can be virtually eliminated in the manner according to aspects of the invention, with the inerter functionality of the entire inerter device being maintained at the same time, a significantly higher inerter mass can be worked with than is possible in the known cases.

According to aspects of the invention, it is therefore a core concept to work with an increased inerter mass, and therefore the inerter functionality can have a greater positive effect on the driving behavior of the vehicle in the specific driving situations conceived for the inerter functionality. This is possible by the fact that the coupling device is operated exclusively in defined coupling positions, and undefined transition phases between a static friction situation and a sliding friction situation between the control disk, on the one hand, and the contour disk, on the other hand, are avoided.

The increase of the inerter masses now leads to the fact that the driving behavior of the entire vehicle is improved and the advantages of the inerter functionality can be provided to an even greater degree or in an even broader framework.

An inerter device according to aspects of the invention can be developed to the effect that the contact element has a sliding surface which, during the movement of the inerter mass into the securing position, slides on a mating contact element designed as a mating sliding surface of the contour disk. In addition to other possibilities, such as, for example, lever guides, slotted link guides or similar, sliding surfaces and mating sliding surfaces are particularly simple and cost-effective and above all compact possibilities of realizing the contact element and the mating contact element. Of course, combinations of such sliding surfaces and further technical embodiments, for example mechanical levers or associated slotted link guides, are also conceivable within the scope of the present invention.

It is likewise possible that, in the case of an inerter device according to aspects of the invention, the sliding surface and the mating sliding surface are oriented parallel or substantially parallel to each other. In this case, the sliding surface and/or the mating sliding surface in particular form an oblique plane, which planes can subsequently slide on each other during the described relative movement. This is also an even further simplified and cost-effective configuration which in particular can be installed very compactly in the coupling surfaces. The sliding on one another is reduced here to a small surface, wherein the individual surfaces of the sliding surface or of the mating sliding surface can be adapted to said sliding. It is thus conceivable to work here with reduced coefficients of friction or to adapt the surface areas of the sliding surface and of the mating sliding surface to the desired sliding functionality, such that as low a sliding resistance as possible has to be overcome.

It can likewise be of advantage if, in the case of an inerter device according to aspects of the invention, the sliding surface and the mating sliding surface are designed for a quantitatively controlled movement from the coupling position into the release position.

While the basic inventive functionality is already obtained by the fact that, from a defined driving force, the spring force as counterforce is overcome, and the coupling device undoes the operative connection by the control disk moving relative to the contour disk into the release position, in addition to said purely qualitative control functionality a quantitative control or quantitative regulation may also be expedient. For example, within a defined force range which signifies the transition between too great a driving force and a mechanically acceptable driving force which is still sustainable, a quantitative transition is provided. In other words, it is conceivable that, with the aid of the contact element and the mating contact element between the control disk and the contour disk, not only can the operative connection be activated and eliminated, but also, by means of formation of a defined slip, a sliding friction situation can be provided in the coupling device in a defined and mechanically automated manner. The flexibility in the use of an inerter device according to aspects of the invention can therefore be improved even further and at the same time the described advantages in particular of a significantly increased inerter mass can be retained.

It is furthermore likewise of advantage if, in the case of an inerter device according to aspects of the invention, the spring device has a torsion spring which in particular is fastened at one end to the inerter mass and at its other end to an end of the inerter drive that faces away from the inerter mass. The inerter drive can be defined here in particular as an elongate driving spindle which, for example, has an internal cavity. In such a cavity, the spring device or the torsion spring of the spring device can extend axially and can therefore provide the desired pretensioning spring force in a particularly compact design. Furthermore, a torsion spring is of great advantage since it has greater constancy in respect of the spring characteristic and can therefore be better present than is possible in the case of other spring devices. However, the basic inventive functionality can, of course, also be achieved with other spring devices or with combinations of different springs.

Furthermore, it can be of advantage if, in the case of an inerter device according to aspects of the invention, the torsion spring is loaded in the axial direction with a pretensioning force by a pretensioning spring. This can be, for example, a disk spring at the lower end of the inerter device or of the torsion spring. Owing to the fact that, at the other end of the torsion spring, namely in the case of the inerter mass, a relative movement is intended to be carried out between the inerter mass and the inerter drive, this can also lead to relative movements between the spring device, on the one hand, and the inerter mass, on the other hand. In order to be able to compensate for such relative movements or to permit increased manufacturing tolerances, tolerance compensation or such a movement compensation can be provided with the aid of a disk spring. This is also a particularly simple and cost-effective solution for exerting this pretensioning force on the torsion spring.

Furthermore, it is advantageous if, in the case of an inerter device according to aspects of the invention, the mechanical inerter drive has a slotted drive link, in particular in the form of a driving thread. A slotted drive link is a particularly simple, cost-effective and especially compact possibility of providing a mechanical drive for the inerter mass. A corresponding mechanical drive therefore preferably has a driving spindle, on the circumference of which a driving thread for forming the slotted drive link is provided either as an external thread or as an internal thread. This simply and cost-effectively demonstrates an embodiment as to how a mechanical inerter drive can be designed within the scope of the present invention.

A further advantage can be achieved if, in the case of an inerter device according to aspects of the invention, the inerter mass is mounted via a bearing device for a rotatorially configured inerter mass movement. A rotatory inerter mass movement likewise leads to great advantages in respect of the compactness of the entire system.

In particular, no additional movement clearance has to be provided since the inerter mass is preferably of rotationally symmetrical or substantially rotationally symmetrical design in such an embodiment. The position of the inerter mass therefore corresponds to the stationary position during the entire inerter mass movement, and therefore an additional construction space is no longer necessary. The mounting can be designed, for example, as a rolling mounting and can in particular have a mounting in two rows in order in a corresponding manner to be able to reliably and mechanically stably remove even high forces which arise during the inerter mass movement.

Furthermore, it is of advantage if, in the case of an inerter device according to aspects of the invention, an additional bearing device, in particular in the form of a rolling bearing, is arranged between the inerter mass and the coupling device, in particular the contour disk. This is an additional support, in particular against distortion within the entire system of the inerter device. This leads to further stabilization of an inerter mass movement which is configured in particular as a rotational movement.

The present invention likewise relates to a stabilizing device for the wheel suspension of a vehicle. Such a stabilizing device has a spring device for absorbing forces acting on the wheel suspension. Furthermore, a damper device is provided for damping speeds acting on the wheel suspension. Finally, at least one inerter device which has the features of the present invention is provided in order to provide control of accelerations acting on the wheel suspension. A stabilizing device according to aspects of the invention therefore affords the same advantages as have been explained in detail with respect to an inerter device according to aspects of the invention.

BRIEF DESCRIPTION OF THE DRAWINGS

Further advantages, features and details of the invention emerge from the description below in which exemplary embodiments of the invention are described in detail with reference to the drawings. The features mentioned in the claims and in the description may be essential to the invention in each case individually by themselves or in any combination. In the drawings, schematically:

DETAILED DESCRIPTION OF THE INVENTION

Figure 1:
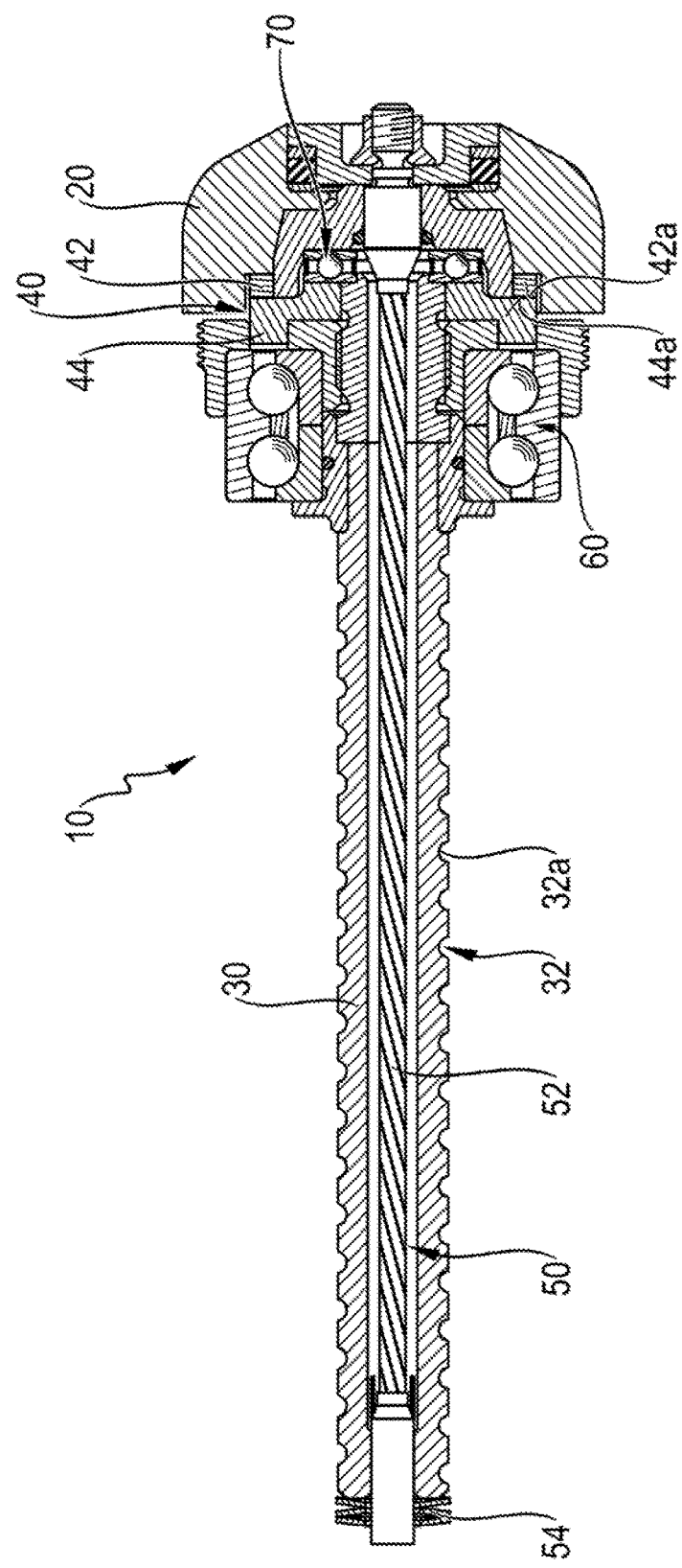
FIG. 1 shows a schematic cross section through an embodiment of an inerter device.

FIGS. 1 to 6 show an embodiment of an inerter device 10 according to aspects of the invention. Partial sections have been undertaken here in particular in FIGS. 3 and 4, or parts of the components have been removed in order to be able to implement a better view into the interior components and a corresponding simpler description of the manner of operation. An inerter device 10 here has a mechanical inerter drive 30. Said mechanical inerter drive 30 is designed as a driving spindle, onto the outer side of which a slotted drive link 32 in the form of a driving thread 32a is placed. As soon as a relative movement is now carried out with said slotted drive link 32, a corresponding rotational movement can be provided which can be transferred as a mechanical driving force to an inerter mass 20. The inerter mass 20 is arranged in the shape of a hemispherical head at the upper end, at the right end in FIG. 1. Said inerter mass 20 is now set into movement by means of the mechanical inerter drive 30 by the transfer of the driving force. In order to transfer said driving force, an operative connection is provided between the inerter drive 30, on the one hand, and the inerter mass 20. Said operative connection is provided by a coupling device 40 which is explained in more detail below.

Figure 2:
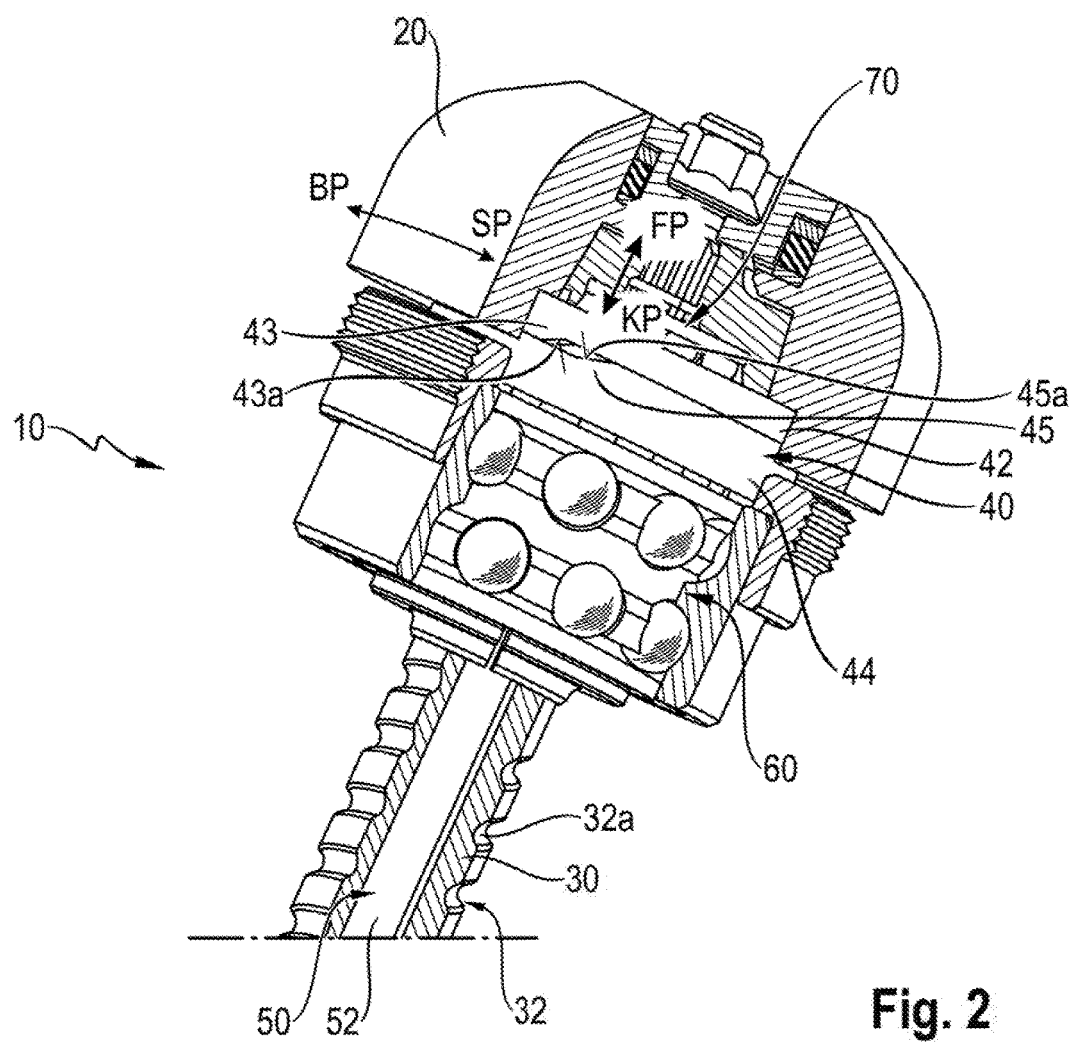
FIG. 2 shows the embodiment of FIG. 1 in partial section in the region of the inerter mass.
Figure 3:
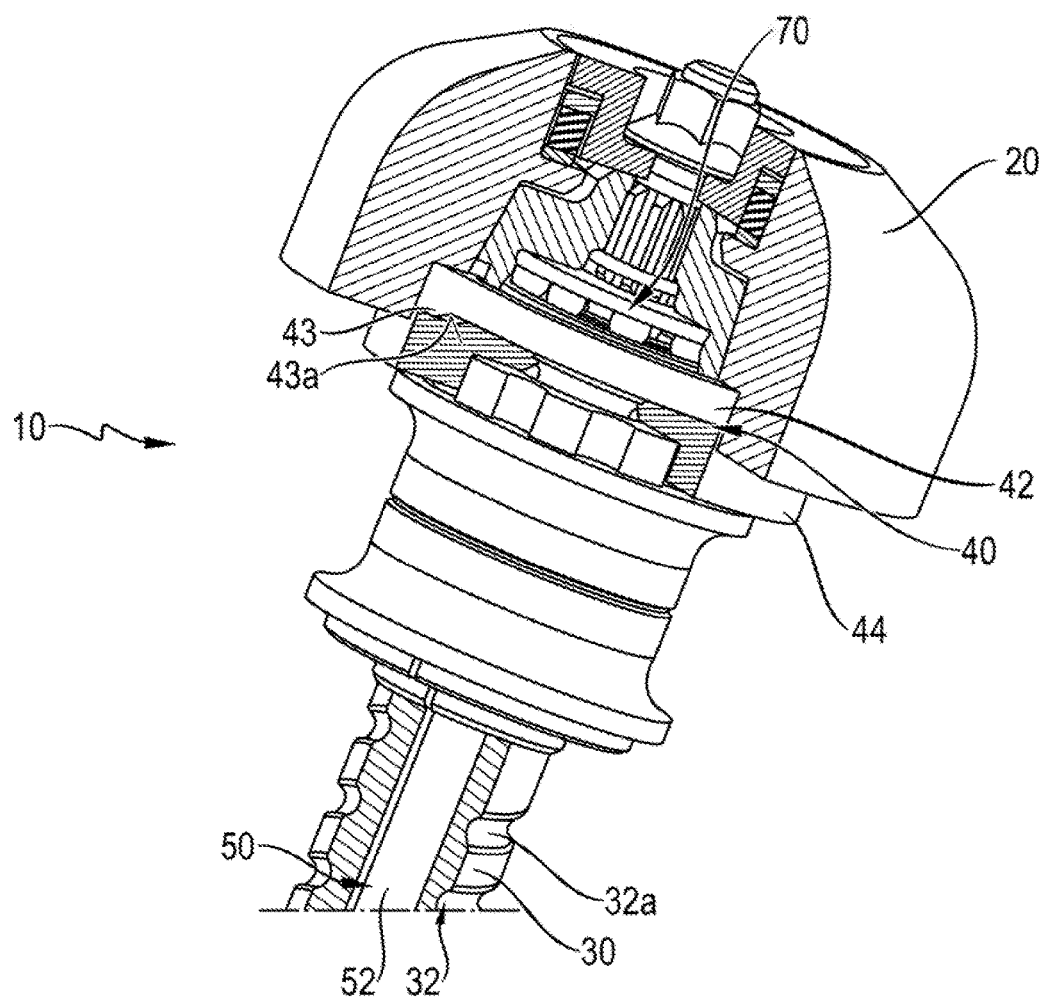
FIG. 3 shows the embodiment of FIGS. 1 and 2 without the bearing device.
Figure 4:
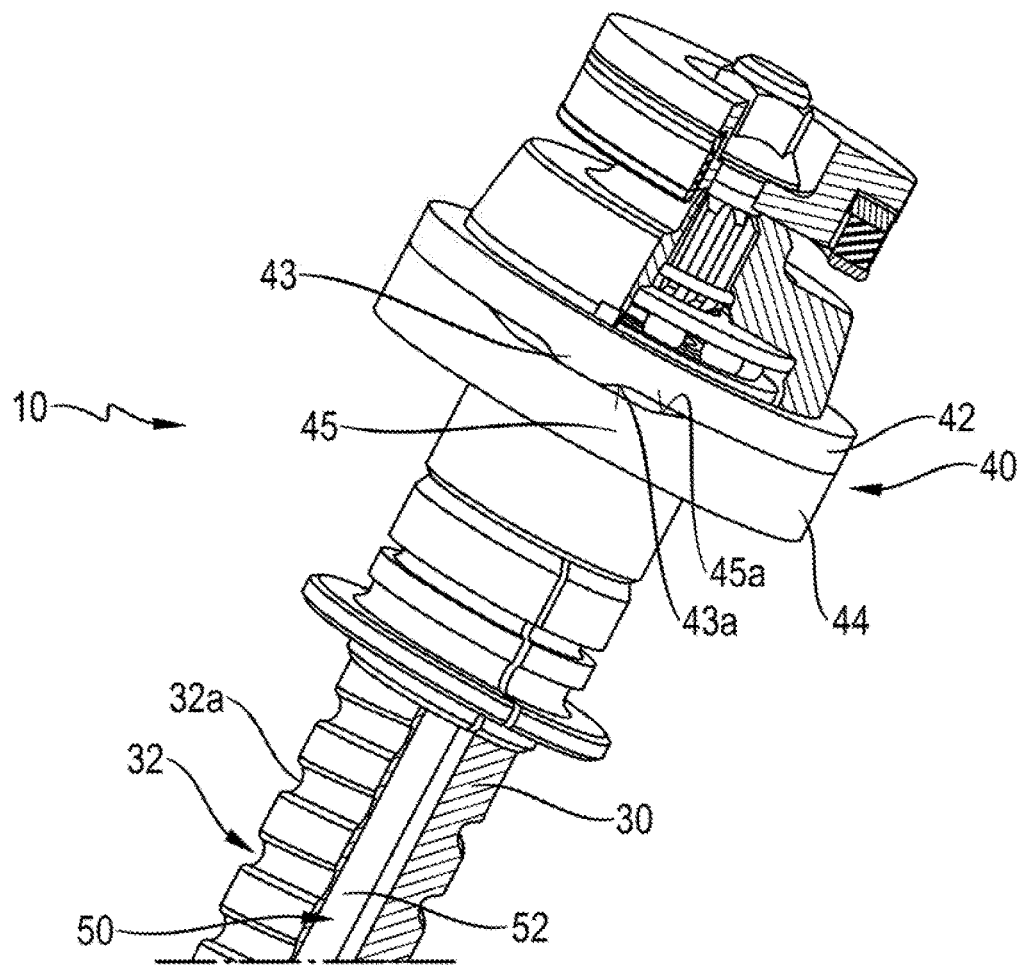
FIG. 4 shows the embodiment of FIGS. 1 to 3 without the inerter mass.

Parts of the coupling device 40 can be seen in particular in FIGS. 2 to 4. The main components of the coupling device 40 here are a control disk 42, which is connected to the inerter mass 20, and a contour disk 44, which is connected in turn to the inerter drive 30. As soon as the control disk 42 and the contour disk 44 are in the illustrated position, the operative connection is available and a driving force can be transmitted from the inert drive 30 to the inerter mass 20. This therefore means that the associated coupling surfaces 42a and 44a are in frictional contact with each other in order to form this operative connection.

In order to be able to provide a relative movement and form an automatic mechanical regulation, a spring device 50 is now formed which is arranged as a torsion spring 52 in the interior of the driving spindle of the mechanical inerter drive 30. The introduction of the driving force leads, because of the mass inertia of the inerter mass 20, to the fact that an inertia force has to be removed by the torsion spring 52 of the spring device 50.

As soon as the driving force then becomes of such a magnitude that the corresponding pretensioning by the torsion spring force of the torsion spring 52 is exceeded, a relative rotational movement is carried out between the inerter mass 20 and the inerter drive 30. This relative movement is illustrated in particular in FIG. 2. As soon as the inerter mass 20 is therefore then rotated to the right in FIG. 2 from the operating position BP into the securing position SP, a rotational relative movement is also provided between the control disk 42 and the contour disk 44. Said relative rotation now leads to the contact element 43 now sliding as sliding surface 43a on the mating sliding surface 45a of the mating contact element 45 and therefore raising the control disk 42 from the coupling position KP of the contour disk 44 into a release position FP. In said raised release position FP, the operative connection between the two coupling disks 42 and 44 is removed, and therefore no further driving force can then be transmitted. This can also be understood as a securing position SP for the inerter mass 20 since now, despite further high acceleration forces, no further driving forces can be fed into the inerter mass 20 and therefore into the entire system. At this point, the effect of the inerter mass 20 is therefore limited by the defined counterforce of the torsion spring 52, and therefore the overall forces which can occur in the system of the inerter device 10 are likewise limited.

If the driving forces drop again below the predefined threshold value, the above explanation is carried out again in the reverse manner, and therefore not only is the inerter mass 20 moved back into the operating position BP by the torsion spring force, but furthermore the coupling position KP of the control disk 42 relative to the contour disk 44 is also resumed, and therefore the operative connection is available again for transmitting the driving forces.

Figure 5:
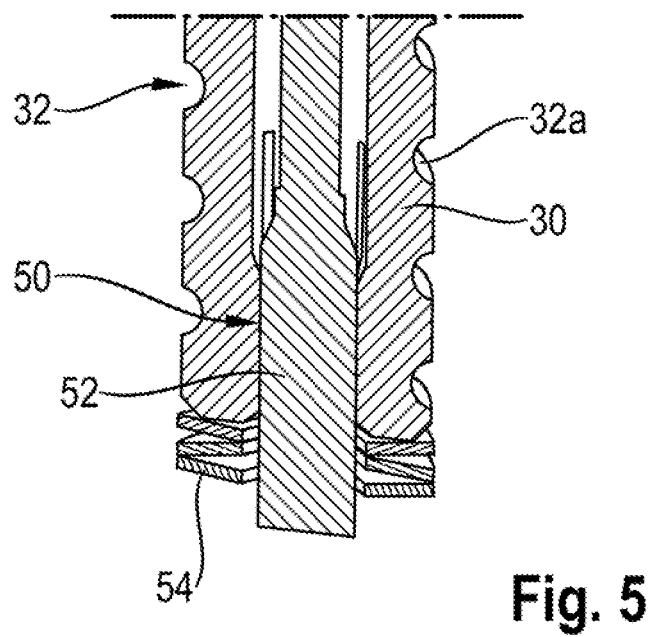
FIG. 5 shows a detailed view of the lower end of the inerter drive.
Figure 6:
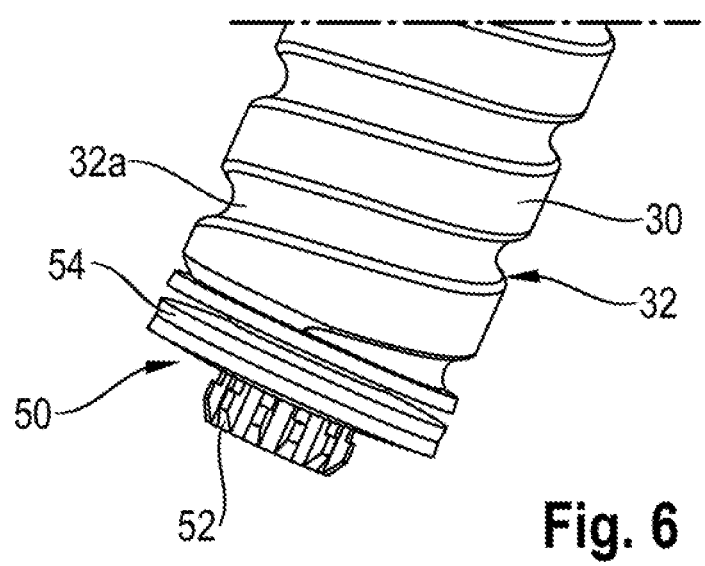
FIG. 6 shows the view of FIG. 5 in a closed illustration.

FIGS. 5 and 6 show a further detail, in which a disk spring 54 is part of the spring device 50, in order to load the torsion spring 52 with a spring force in the axial direction. This serves in particular for tolerance compensation and to provide a desired relative movability between the inerter mass 20 and the upper end of the torsion spring 52.

In order to provide sufficient mounting functionality, bearing devices 60 are designed here as double-row rolling ball bearings and also an additional bearing device 70 for further stabilization against distortion is provided.

Figure 7:
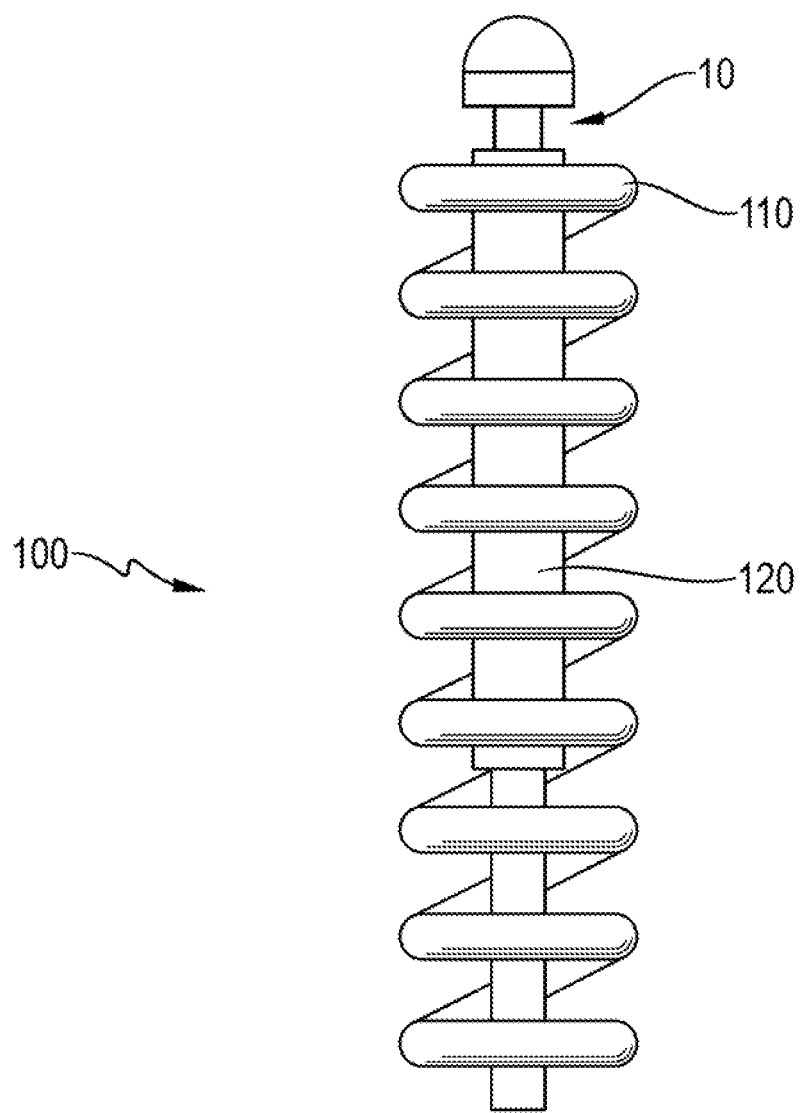
FIG. 7 shows an embodiment of a stabilizing device according to aspects of the invention.

FIG. 7 shows an embodiment of a stabilizing device 100 as can be used in a vehicle. In addition to the known combination of a spring device 110 and a damper device 120, an inerter device 10 according to aspects of the invention is provided here in order now, in addition to spring force effects and speed effects, also to be able to influence acceleration effects in a positive manner by means of the inerter functionality. Spring 110, damper device 120 and inerter 10 are connected in parallel here.

The above explanation of the embodiments describes the present invention exclusively within the scope of examples. Of course, individual features of the embodiments, if technically meaningful, can be freely combined with one another without departing from the scope of the present invention.

What is claimed is:

1. An inerter device for a wheel suspension of a vehicle, the inerter device having an inerter mass and a mechanical inerter drive which, in order to generate an inerter mass movement, is operatively connected to the inerter mass via a coupling device,
   wherein the coupling device has a control disk connected to the inerter mass and a contour disk connected to the inerter drive,
   said control disk and contour disk being frictionally in contact with each other via coupling surfaces,
   wherein the inerter mass is movable relative to the inerter drive counter to a spring force of a spring device reversibly from an operating position (BP) into a securing position (SP),
   wherein the control disk has a contact element which, during the movement of the inerter mass into the securing position (SP), interacts with a mating contact element of the contour disk and reversibly moves the control disk from a coupling position (KP) relative to the contour disk into a release position (FP) in which the coupling surfaces are separated.

2. The inerter device as claimed in claim 1, wherein the contact element has a sliding surface which, during the movement of the inerter mass into the securing position (SP), slides on the mating contact element configured as a mating sliding surface of the contour disk.

3. The inerter device as claimed in claim 2, wherein the sliding surface and the mating sliding surface are oriented parallel or substantially parallel to each other, wherein either one or both of the sliding surface and the mating sliding surface includes an oblique plane.

4. The inerter device as claimed in claim 2, wherein the sliding surface and the mating sliding surface are configured for a quantitatively controlled movement from the coupling position (KP) into the release position (FP).

5. The inerter device as claimed in claim 1, wherein the spring device has a torsion spring which is fastened at one end to the inerter mass and at the other end to an end of the inerter drive that faces away from the inerter mass.

6. The inerter device as claimed in claim 5, wherein the torsion spring is loaded in an axial direction with a pretensioning force by a pretensioning spring.

7. The inerter device as claimed in claim 1, wherein the mechanical inerter drive has a slotted drive link in the form of a driving thread.

8. The inerter device as claimed in claim 1, wherein the inerter mass is mounted via a bearing device for a rotatorially configured inerter mass movement.

9. The inerter device as claimed in claim 1, wherein an additional bearing device, in the form of a rolling bearing, is arranged between the inerter mass and the contour disk.

10. A stabilizing device for the wheel suspension of a vehicle, having a spring device for absorbing forces acting on the wheel suspension, a damper device for damping speeds acting on the wheel suspension, and the inerter device of claim 1 for controlling accelerations acting on the wheel suspension.

* * * * *